United States Patent
Brookman

[19]
[11] Patent Number: 5,915,787
[45] Date of Patent: *Jun. 29, 1999

[54] AIRCRAFT SEAT CHILD RESTRAINT DEVICE

[75] Inventor: Michael J. Brookman, Davie, Fla.

[73] Assignee: DME Corporation, Fort Lauderdale, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/639,262

[22] Filed: Apr. 23, 1996

[51] Int. Cl.$^6$ ........................................................ B60N 2/28
[52] U.S. Cl. .............................. 297/256.13; 297/256.16; 297/473; 297/484
[58] Field of Search .............................. 297/256, 256.16, 297/253, 484, 473, 17, 255, 250.1, 256.13

[56] References Cited

U.S. PATENT DOCUMENTS

| | | | |
|---|---|---|---|
| D. 330,639 | 11/1992 | Munro et al. ........................... | 297/17 X |
| 2,576,867 | 11/1951 | Wilson, Jr. ............................... | 297/484 |
| 2,908,324 | 10/1959 | Muller et al. . | |
| 3,125,375 | 3/1964 | Bird et al. . | |
| 3,218,103 | 11/1965 | Boyce . | |
| 3,278,230 | 10/1966 | Boyce et al. . | |
| 3,301,594 | 1/1967 | Pukish, Jr. . | |
| 3,321,247 | 5/1967 | Dillender . | |
| 3,499,681 | 3/1970 | Benitez, Jr. et al. . | |
| 3,709,558 | 1/1973 | Jakob . | |
| 3,992,040 | 11/1976 | Gannac . | |
| 4,026,245 | 5/1977 | Arthur . | |
| 4,040,664 | 8/1977 | Tanaka et al. ........................ | 297/484 X |
| 4,050,737 | 9/1977 | Jordan . | |
| 4,175,787 | 11/1979 | Muskat ..................................... | 297/484 |
| 4,186,961 | 2/1980 | Farrell, Jr. et al. ............. | 297/256.16 X |
| 4,205,877 | 6/1980 | Ettridge ........................... | 297/256.13 X |
| 4,396,228 | 8/1983 | Go ........................................... | 297/484 |
| 4,619,468 | 10/1986 | Spill . | |
| 4,693,495 | 9/1987 | Lapointe . | |
| 4,763,911 | 8/1988 | Gebhard et al. ...................... | 297/17 X |
| 5,158,337 | 10/1992 | Leggett ................................. | 297/250.1 |
| 5,277,472 | 1/1994 | Freese et al. .................. | 297/256.16 X |
| 5,378,038 | 1/1995 | Koyangi et al. .................... | 297/256.13 |
| 5,395,154 | 3/1995 | Wang ..................................... | 297/17 X |
| 5,431,478 | 7/1995 | Noonan .......................... | 297/256.16 X |
| 5,478,096 | 12/1995 | Ting ..................................... | 297/17 X |
| 5,489,144 | 2/1996 | Lewis ................................... | 297/17 X |
| 5,524,965 | 6/1996 | Barley ............................... | 297/256.16 |
| 5,568,959 | 10/1996 | Weber et al. ....................... | 297/255 X |

FOREIGN PATENT DOCUMENTS

| | | | |
|---|---|---|---|
| 545185 | 6/1993 | European Pat. Off. ......... | 297/256.16 |
| 935610 | 2/1948 | France .................................... | 297/17 |
| 1071491 | 3/1954 | France .................................... | 297/17 |
| 2342872 | 9/1977 | France .................................... | 297/484 |
| 2425957 | 1/1980 | France .................................... | 297/484 |
| 309647 | 10/1932 | Italy ........................................ | 297/17 |

Primary Examiner—Peter M. Cuomo
Assistant Examiner—David E. Allred
Attorney, Agent, or Firm—Malin, Haley, DiMaggio & Crosby, P.A.

[57] ABSTRACT

A small child and infant restraint device is disclosed which can be used with an existing seat of a transportation member such as an aircraft passenger seat. The restraint device includes a base member connected to a back panel by a hinge member. A seat pan provides a seating surface for the child or infant. A seat belt path is defined between the seat pan and the base member for disposal across the base member of a seat belt associated with the existing passenger seat, for attaching the restraint device to the existing passenger seat. The restraint device can be utilized in a forward facing configuration or in an aft facing configuration. The forward facing configuration is utilized with small children and toddlers, while the aft facing configuration is utilized with infants and small children without sufficient neck development. When the device is not in use, the back panel is folded down towards the base member to form a relatively thin stowable assembly where it can be properly stored.

30 Claims, 8 Drawing Sheets

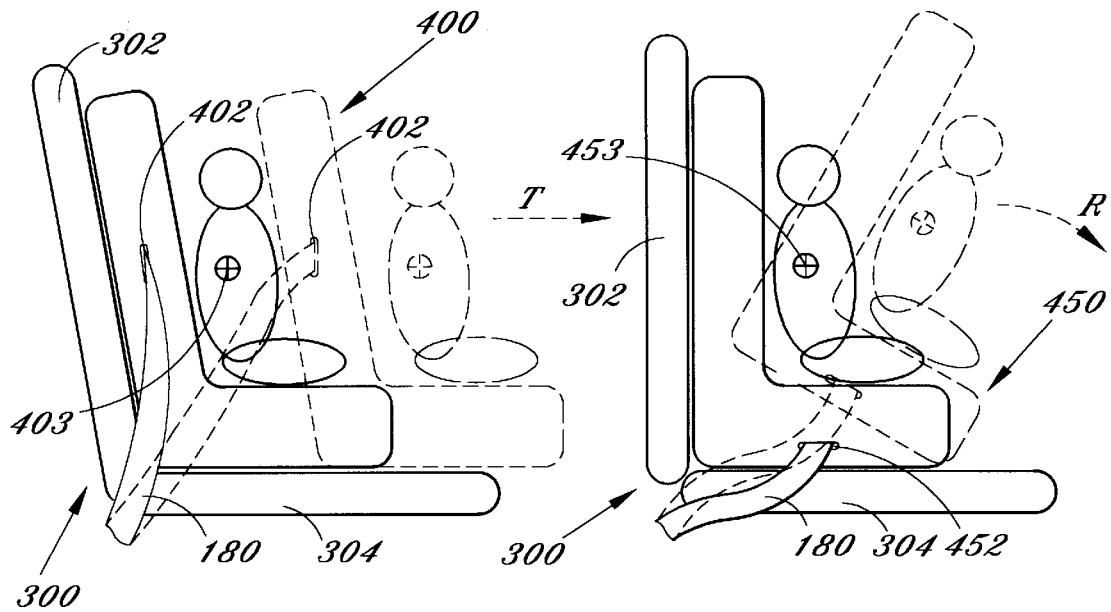
Fig. 1
Prior Art
Fig. 2
Prior Art
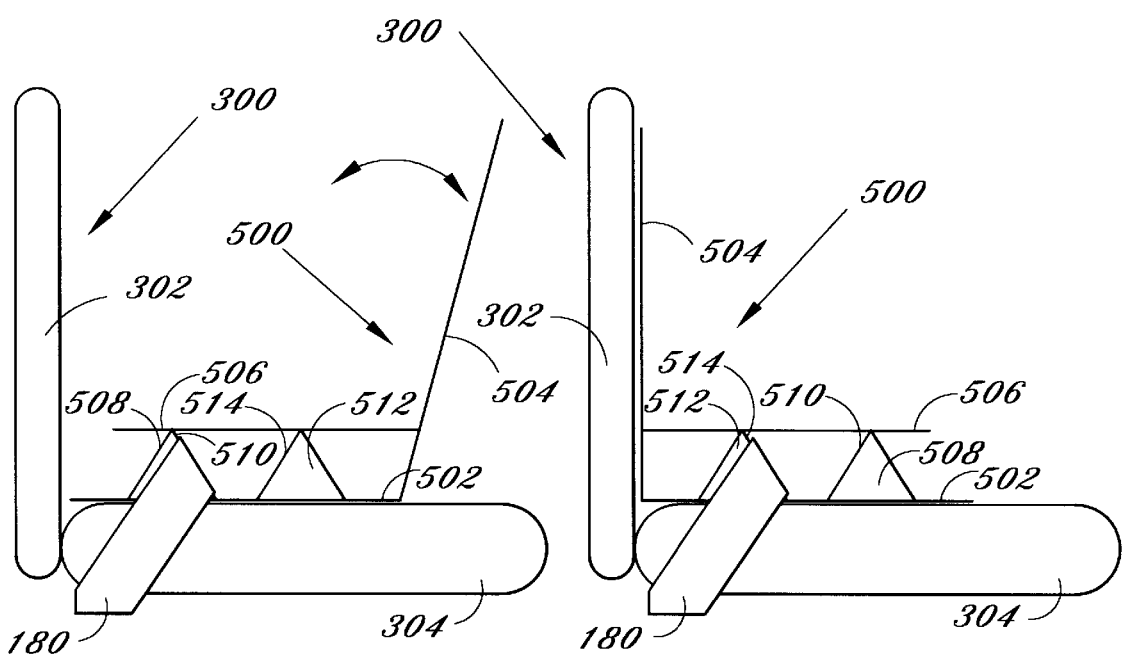
Fig. 14
Fig. 15

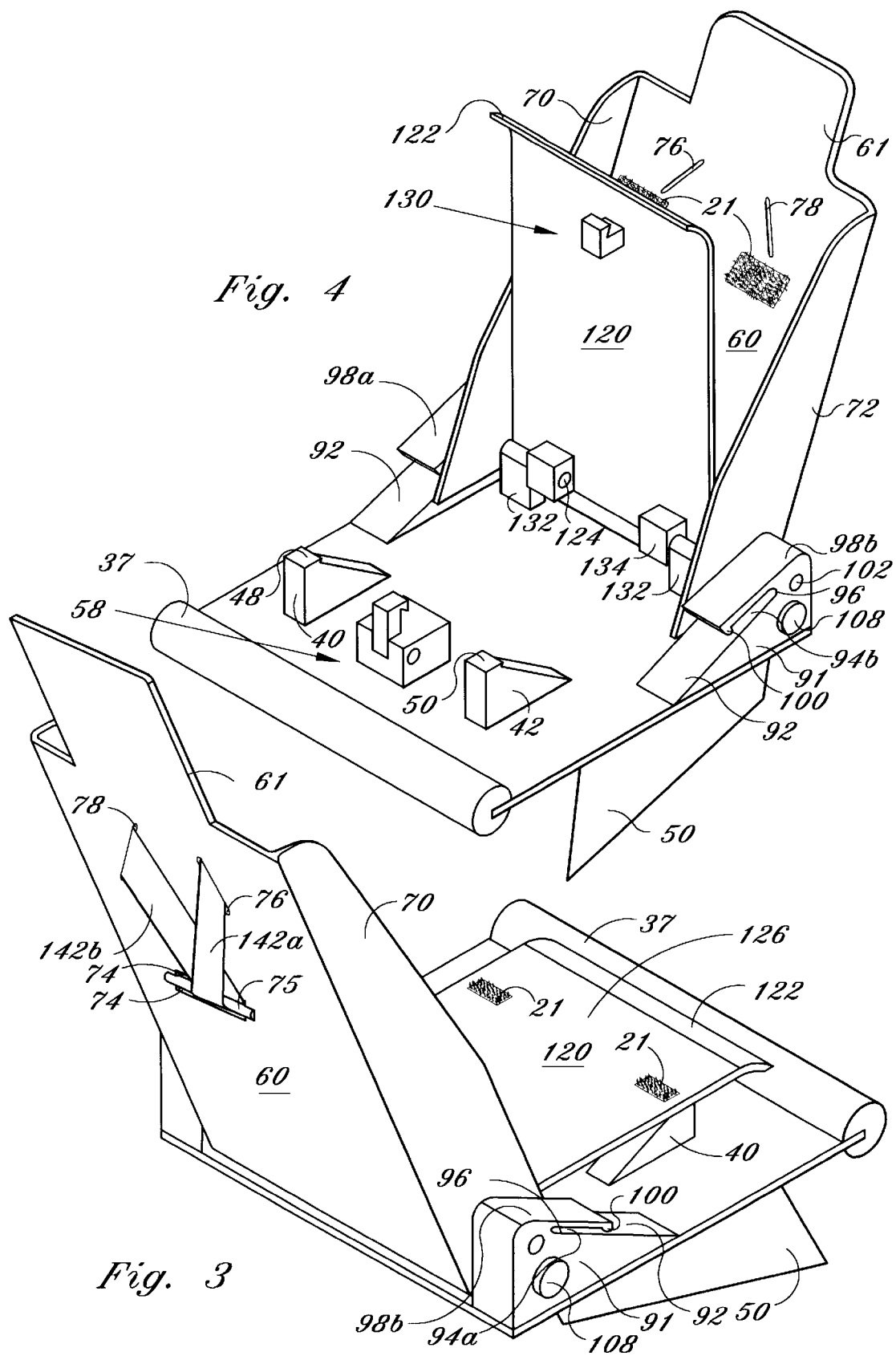

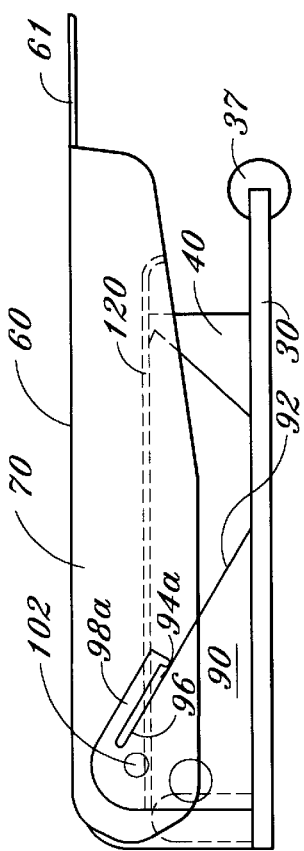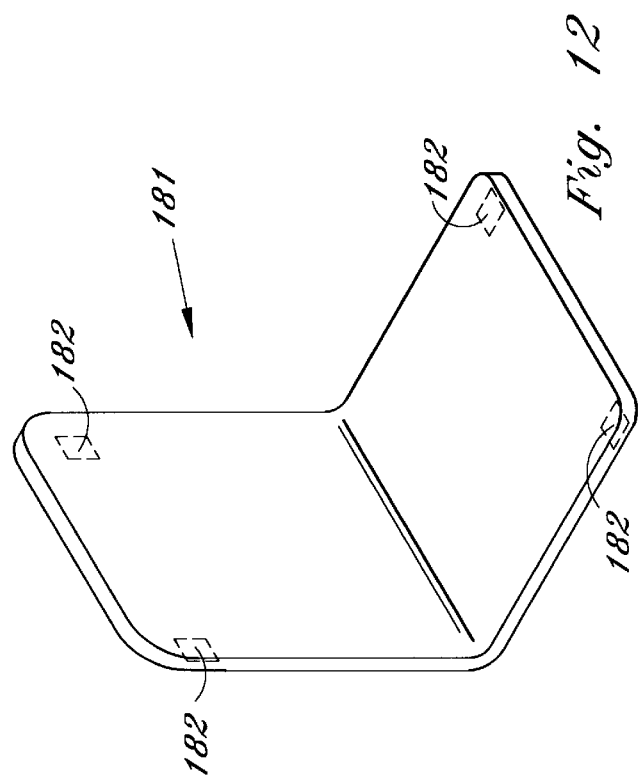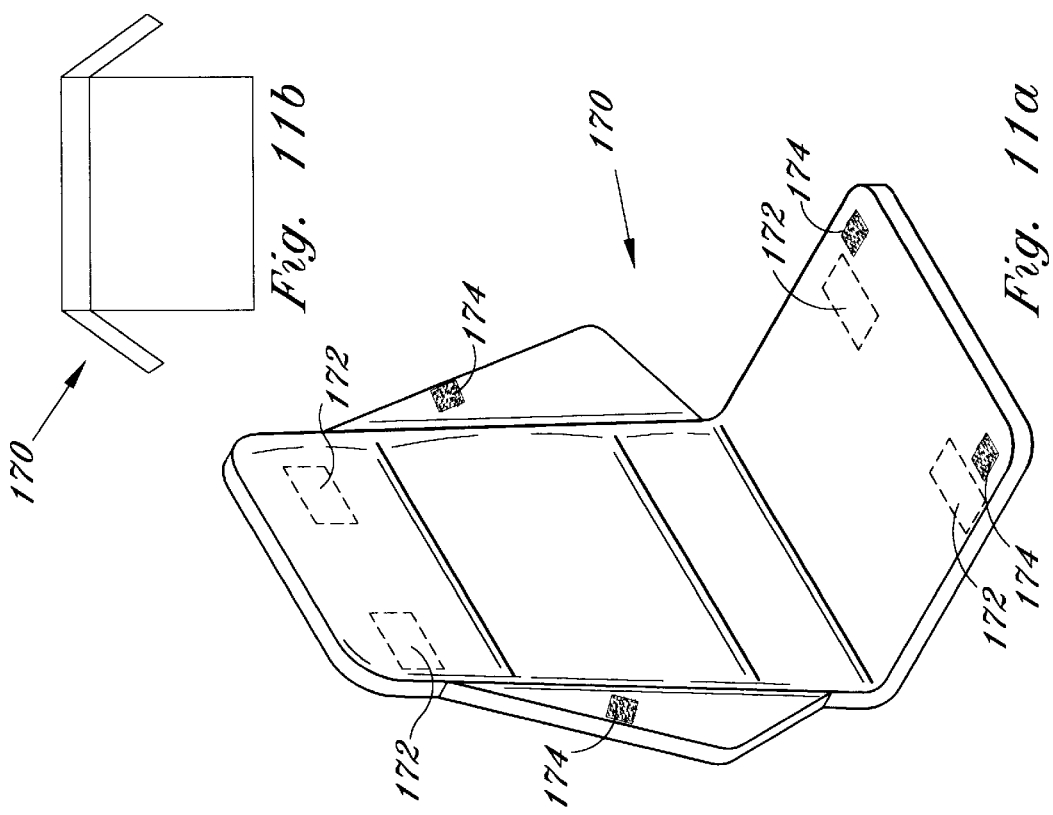

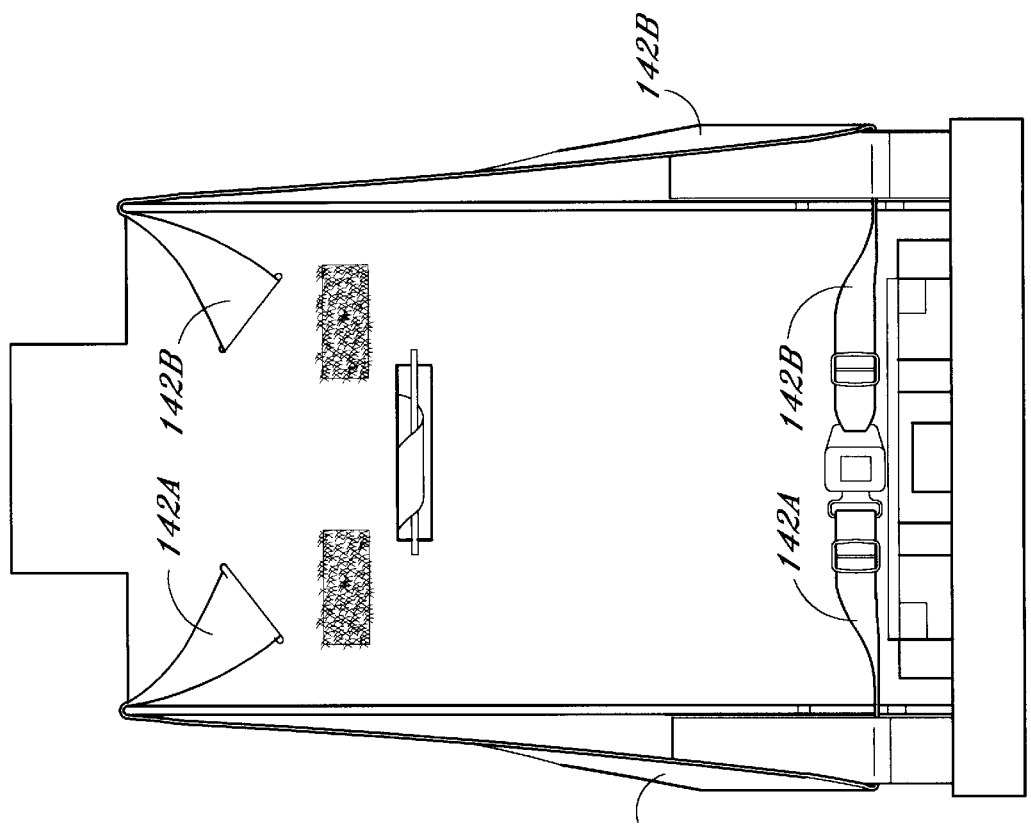
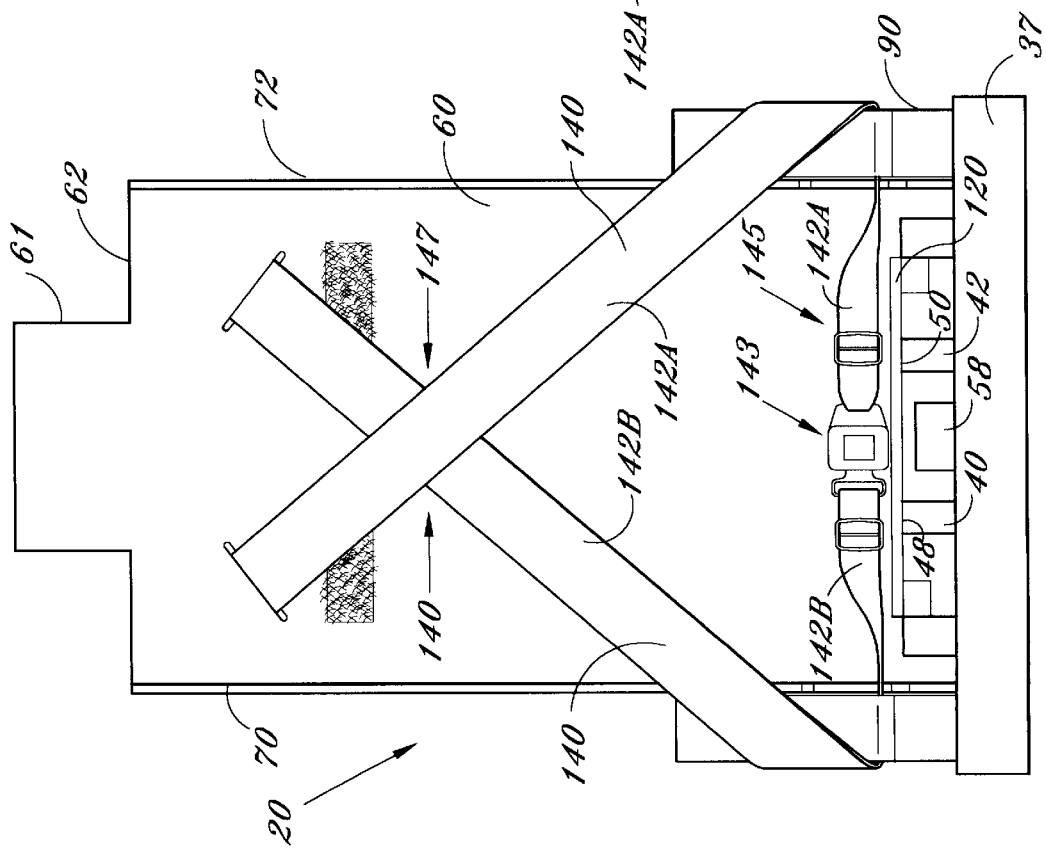

AIRCRAFT SEAT CHILD RESTRAINT DEVICE

BACKGROUND OF THE INVENTION

1. Field of the Invention

The present invention relates generally to infant and toddler's protective devices and in particular to a child restraint devices designed for attachment to a vehicle seat such as an aircraft passenger seat.

2. Description of the Prior Art

Child restraint devices have basically been designed for use in privately owned passenger automobiles. This use is limited to normally one or two children over the useful life of the restraint device. Furthermore, the restraint device is designed for long stable placements in normally one or two automobiles. As the restraint device is intended for long stable placements, relatively routine removal and replacement of the attached device in a passenger seat is generally a cumbersome process.

Examples of previous restraint devices include U.S. Pat. No. 4,040,664 issued to Tanaka et al. for a "Harness Anchoring for Child Safety Seat": U.S. Pat. No. 3,709,558 issued to Jakob for a "Child Safety Seat"; U.S. Pat. No. 3,992,040 issued to Gannac for a "Safety Harness for Use By a Child In a Vehicle"; U.S. Pat. No. 3,321,247 issued to Dillender for a "Child's Safety Harness"; U.S. Pat. No. 3,301,594 issued to Pukish for a "Safety Harness"; and U.S. Pat. No. 3,125,375 issued to Bird et al. for a "Safety Seat Harness for Vehicle".

Between forty thousand (40,000) to fifty thousand (50,000) children under the age to two (2) travel by airplane daily in the United States. Current Federal Aviation Administration (FAA) rules allow children under the age of two (2) to be retained in parents' laps, which obviously provides little, if any, protection to the child during an accident or in an emergency situation. Recent studies found that placing unrestrained children on the lap of an adult is "likely to promote fatalities and injuries to these children in an impact situation." Additionally, supplementary restraints for lap held children was found to possibly "promote other injuries due to the manner in which the restraining forces are transmitted to the children."

Performance standards for child restraint systems sold in the United States are defined by Federal Motor Vehicle Safety Standard 213 (FMVSS-213). Performance criteria of child restraint systems installed in airplane seats should at least provide the level of protection implied in the government standards and test procedures by which they are approved. These criteria include protection from serious injury to the head, chest, and legs.

Conventional restraint devices used for automobiles are inadequate for use with existing aircraft seats. There are important differences between airplane and automobile seats. The main problem is the fact that the anchor point for an automobile seat is located generally aft and below the point where the back and sitting portion of the frame members meet. As seen in FIG. 1, a back mounted conventional car restraint device 400 is shown attached to a conventional airline passenger seat 300 by the insertion of seat belt 180 through a slot 402. With this attachment, the attachment point of the car restraint device 400 is adjacent to a center of gravity 403 of the secured child which prevents significant, if any, vertical movement of restraint device 400. However, the attachment angle is approximately one hundred and ten (110°) degrees, which places the attachment point too far back for safety purposes. Thus, in an airline accident, car restraint device 400 is not secured tightly, relative to the imposed horizontal vector, and can move translationally (horizontally), as indicated by arrow T, at least six (6) inches creating an unsafe condition for the child secured within car restraint device 400.

A "below the knee" mounted car restraint device 450 is shown attached to a conventional airline passenger seat 300 by the insertion of seat belt 180 through a slot 452 (FIG. 2). With this attachment, the attachment point of the car restraint device 450 is below a center of gravity 453 of the secured child. Furthermore, the attachment angle is approximately twenty (20°) degrees, which places the attachment point too far forward for safety purposes. Thus, in an airline accident, car restraint device 450 is not secured tightly relative to the vertical vector and can move rotationally, as indicated by arrow R, creating an unsafe condition for the child secured within car restraint device 450.

FAA's studies have shown that conventional car seats perform poorly in simulated aircraft accidents. Present automotive standards allow for forward head translation of thirty two (32) inches, but considering current aircraft seat pitches, the proper limit for an aircraft device should be closer to twenty four (24) inches. Seat belts 180 used for existing aircraft are positioned approximately 10 inches forward from the point that the automobile seat belts are located. Thus, if aircraft seat belt 180 is inserted through the slot in the back portion of the conventional restraint device a tight attachment of the device to the aircraft seat is not possible.

Thus, during an accident the loose attachment of a conventional car restraint device to an aircraft passenger seat, would cause the restraint device to rotate or travel forward, via rotational or translational forces acting on the aircraft passenger seat. This scenario could possibly cause the child or infant disposed therein to hit his or her head against the food tray or seat disposed in the row in front of the infant or child. Accordingly, conventional restraint devices can not be sufficiently anchored to prevent a child's head from striking the seat ahead. As such, too much forward or rotational movement is allowed. Even when the forward or rotational movement is within federal standards of thirty two (32) inches, a child's head can still hit the seat ahead.

According, to FAA document No. DOT/FAA/AM-94/19 entitled "The Performance of Child Restraint Devices in Transport Airplane Passenger Seats" dated September 1994 (hereinafter referred to as the "FAA Report"), lap belts for automobiles are attached at locations that are geometrically different from a typical airplane passenger seat. Inboard and outboard belt anchor points 602 and 604, respectively, on an automotive seat 600 are at different heights (FIG. 17). A line passing through the belt anchor points is not parallel to the lateral line defined by a seat back pivot axis 606. The lap belts on an airplane seat 700 are usually located near a horizontal lateral line passing through a cushion reference point 702 (FIG. 16). This difference results in a more vertical lap belt path over the restraint device in the airplane seat.

Automotive seat backs do not rotate forward in a manner representative of airplane passenger seats during impact. See FAA report which is incorporated by reference as if fully set forth herein. Airplane passenger seats commonly have breakover seat backs as a convenience feature. On seats with breakover backs, the seat back can be rotated forward to a horizontal position by pushing on the seat back, nominally with thirty (30) pounds of force applied at the top of the seat back. The combined effects of breakover seat backs and aft row occupant impact forces transferred through the seat back in an accident situation were not evaluated by FMVSS-213 when the current standards were adopted.

Additional problems with the use of conventional restraint devices is that modern automobile restraints use a short fixed-length strap on one side. The tension of the belts and shoulder straps is automatically adjusted by the retractor mechanism in the inertia reel. Typically, an automobile buckle is positioned to the inboard side of the occupant when in use. See FAA Report. Airplane passenger seat belts are manually adjusted, and the range of adjustment is limited. The buckle on an airplane passenger seat is centered over the lower abdomen when adjusted by an adult occupant.

Another problem is that the available lateral space for the installation of a child restraint device on airplane seats is limited to the distance between the arm rests. Typically, this distance is 16.5 to 17.5 inches on economy class seats. On most economy class seats the arm rests can be raised to stowed position which provides additional space. However, seats in some rows have non-stowable arm rests. See FAA Report. Thus, space requirements are also an important consideration for the child restraint device.

The FAA Report found that conventional forward facing restraint devices were unacceptably loose when attached to an airplane passenger seat due to vertical path of the lap belt securing the device to seat. The vertical path of the lap belt is created by the lap belt anchor point of the airplane seat. During testing, the restraint device was able to move forward approximately six (6) inches, even with the lap belt adjusted to its minimum length. See FAA Report. This loosely secured conventional child restraint device resulted in poor performance during testing and could cause serious injury in use. The FAA report labeled the poor interface with airplane lap belts which resulted in a very loose fit as a "misuse condition."

The attachment of the conventional child restraint device to the airplane seat results in a nearly vertical angle of the airplane lap belts that secures the child restraint device. When installed, the lap belt path angle from the airplane seat attachment to the child restraint device ranged from approximately eighty five (85°) to ninety three (93°) degrees above horizontal. This vertical load path does not produce an effective restraint of forward motion. See FAA Report. An angle greater than ninety (90°) degrees means the seat belt anchor is forward of the child restraint device's belt path. During horizontal impact conditions, the child restraint device must translate forward until the belt path angle is significantly less than ninety (90°) degrees for belt tension forces to restrain the child restraint device. Accordingly, use of a conventional child restraint device on airplane passenger seats creates an undesirable and dangerous condition.

The FAA Report also found conventional harnesses and backless booster seats to also be dangerous for aviation use. The harnesses also allowed too much room for movement. It was found that due to the limited adjustment range and anchor location of the airplane seat lap belts, the harness restraint could not satisfactorily restrain the motion of a typical three (3) year old child. See FAA Report. The loose tensions of the lap belts did not provided a secure restraint utilizing the harness. As to booster seats, airline seat backs, are designed to rotate forward. As the child booster seat are backless, in a crash a child could be crushed between the booster seat and the seat back. The FAA Report also found that the booster seat could not be correctly installed in an airplane seat and that the child occupant could be exposed to potential abdominal injury due to the combined effects of forces imparted from the aft row occupant and the seat back breakover.

The FAA Report concluded that the performance of certain types of child restraint devices, currently available, do not enhance the level of safety for children in transport airplane passenger seats and that the expectation of equivalent protection for children restrained in certain types of child restraint device traveling by automobile can not be met in an airplane seat. FAA Report, Page 27. One of the stated reasons for these negative results is that the restraint devices are designed to meet automotive requirements, which do not necessarily adapt properly to an airplane seat. Airplane seat belts differ in anchor point geometry, tension adjustment, and buckle hardware. The lap belt anchor point geometry on airplane seats does not afford effective restraint of forward excursion of the occupant with this type of child restraint. These differences adversely affect the performance of child restraint devices designed primarily for the automobile interior.

Additionally, conventional aft facing child restraint devices also have the problem of interfering with passage between the seat rows and the recline motion of a forward row seat due to the forward overhang of the aft facing restraint.

Furthermore, any modification to any part of an aircraft requires extensive testing to be performed per strict aviation regulations. This is in addition to the cost and time which is involved for such testing and modifications of a new aircraft seat, as well as the time involved in obtaining governmental approval. Thus, the possibility of changing the position of seat belts on existing airline passenger seats, to make use with car restraint devices safe, is not practical.

Accordingly, what is needed in the art, is a child restraint device which can be safely utilized with an existing aircraft passenger seat and lap belt in either a forward facing orientation or an aft facing orientation, and without modification to the aircraft seat or lap belt. It is therefore, to the effective resolution of the aforementioned problems and shortcomings that the present invention is directed.

SUMMARY OF THE INVENTION

The present invention provides a small child and infant restraint device which can be used with an existing seat of a transportation member such as an aircraft passenger seat. The restraint device includes a base member connected to a back panel by a hinge member. The back panel can be disposed at a predetermined angle with respect to the base member and retained in place by a locking pin. A seat pan provides a seating surface for the child or infant and is connected at its rear end to the base member by a second hinged member. A latching member can be provided approximate to the front end of the seat pan to provide support for and securement of the seat pan. A seat belt path is defined between the seat pan and the base member for disposal across the base member of a seat belt associated with the existing seat for attaching the restraint device to the existing passenger seat.

The restraint device can be utilized in a forward facing configuration or in an aft facing configuration. In the forward facing configuration the base member is disposed upon the sitting area of the existing seat. The forward facing configuration is utilized with small children and toddlers, while the aft facing configuration is utilized with infants and small children without sufficient structural development (i.e., neck strength). In the aft facing configuration two wing structures are positioned to support the restraint device at an angle (approximately one hundred and thirty five (135°) degrees). This angle provides comfort support and appropriate restraint for infants, and is comparable to conventional new born restraints utilized with private automobiles.

When the device is not in use, the back panel is folded down towards the base member to form a relatively thin stowable assembly where it can be properly stored. Due to the size and weight characteristics of the restraint device, it is easily storable, as well as transportable. This factor is important given the limited storage space in many transportation vehicles and aircrafts.

The present invention child restraint device is designed for use primarily by common carriers and public transportation authorities with a responsibility for carriage of small children and infants coincident with one or more family members. The child restraint device is designed for use by many children over the operating life of the device. The device is also designed to accommodate the various sizes, strengths, weights and shapes of small children and infants. The present invention is easily installed onto an existing seat, while also providing for quick release of the child in emergency situations.

Preferably, trained personnel are provided for attaching the restraint device to the existing seat to assure a proper controlled installation and that the restraint device meets performance requirements in a specified manner. The restraint device is secured to the vehicle seat using a conventional seat belt or seat and shoulder belt combination. The present invention restraint device provides restraint belt options which allow full restraint at times of greatest risk and a more simpler lap belt restraint at times of less risk.

To meet general hygiene concerns the present invention can be provided with a disposable shield which is replaced each time a different child or infant utilizes the restraint device.

The restraint device is constructed from durable materials and provides a means for inspection for determining mechanical integrity and allowing for item replacement in case of soiling, wear or needed repair.

Accordingly, it is an object of the present invention to provide a child and infant restraint device which can be safely utilized in transportation vehicles, including with airline passenger seats.

It is another object of the present invention to provide a child and infant restraint device which operates in a forward facing orientation, as well as an aft facing orientation.

It is still another object of the present invention to provide a child and infant restraint device which is secured to a conventional airline passenger seat without any modification of the passenger seat.

It is yet another object of the present invention to provide a child and infant restraint device which meets all Federal Aviation Administration regulations and requirements for child restraint devices.

It is an even still another object of the present invention to provide a child and infant restraint device which allows for a plurality of restraint belt configurations to be selected, depending on level of risk, for securing the child or infant within the restraint device.

It is a further object of the present invention to provide a child and infant restraint device which greatly reduces rotational and translational force from acting on the restraint device.

It is yet a further object of the present invention to provide a child and infant restraint device which is relatively easy to transport and store.

It is still another object of the present invention to provide a child and infant restraint device which is designed for use by various children and infants and frequent securement and removal from a passenger seat.

It is yet still another object of the present invention to provide a child and infant restraint device which is designed accommodate children and infants of various heights and weights.

It is still a further object of the present invention to provide a child and infant restraint device which is relatively easy to safely secure to a passenger seat.

In accordance with these and other objects which will become apparent hereinafter, the instant invention will now be described with particular reference to the accompanying drawings.

BRIEF DESCRIPTION OF THE DRAWINGS

The invention may be better understood by reference to the drawings in which:

FIG. 1 is a side view illustrating a conventional automotive restraint device attached to a conventional car seat;

FIG. 2 is a side view illustrating a conventional automotive restraint device attached to a conventional aircraft seat;

FIG. 3 is a back isometric view of the child restraint device in accordance with the present invention;

FIG. 4 is a front isometric view of the invention illustrated in FIG. 3;

FIG. 7 is a side view illustrating the child restraint device shown in FIG. 3 in a folded configuration;

FIG. 9 is a front view illustrating a first restraint belt configuration in accordance with the present invention;

FIG. 10 is a front view illustrating a second restraint belt configuration in accordance with the present invention;

FIG. 11a is an isometric view illustrating a seat pad member in accordance with the present invention;

FIG. 11b is a top view illustrating the seat pad shown in FIG. 11a;

FIG. 12 is an isometric view illustrating a disposable shield member in accordance with the present invention;

FIG. 14 is a side view of alternative child restraint device embodiment illustrated in a aft facing (infant) configuration;

FIG. 15 is a side view the child restraint device shown in FIG. 14 illustrated in a forward facing (toddler) configuration;

DESCRIPTION OF THE PREFERRED EMBODIMENTS

Figure 5:
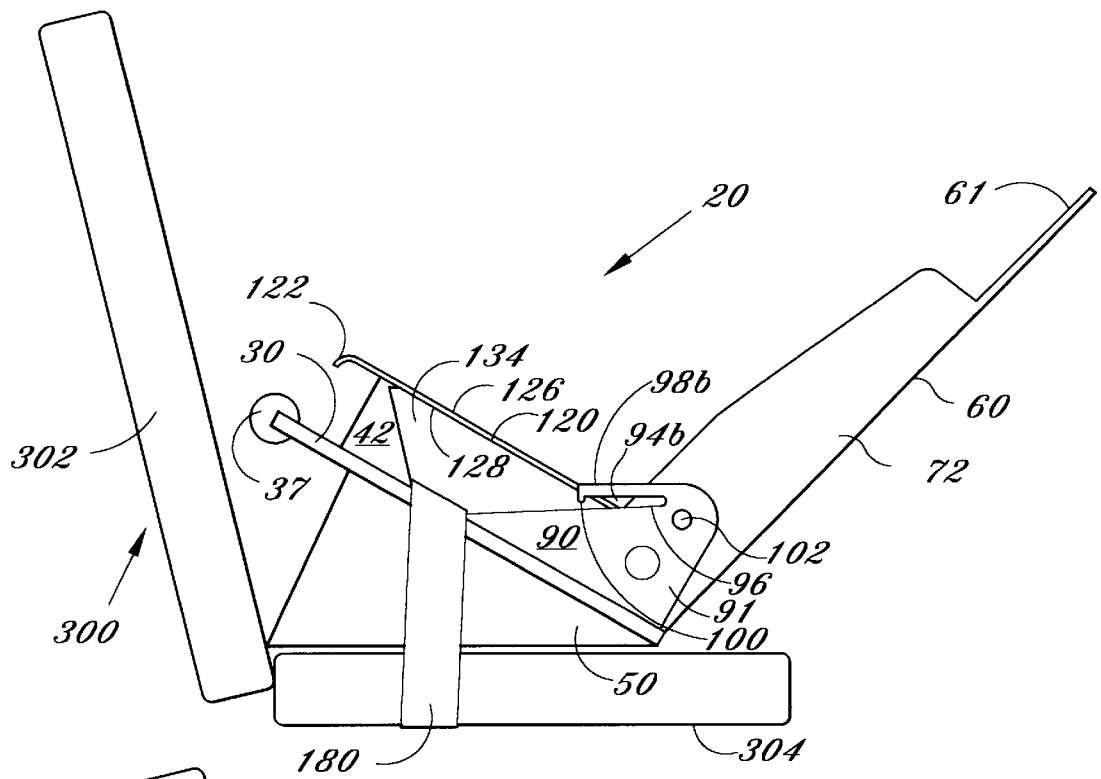
FIG. 5 is a side view illustrating the child restraint device shown in FIG. 3 in an aft facing (infant) configuration.

As seen in FIGS. 3 through 12, a first embodiment of the present invention is shown and generally designated as child restraint device 20. Restraint device 20 generally includes a base member 30, a back panel member 60, a hinged structure 90, a seat pan member 120 and a restraint belt 140. Preferably, restraint device 20 is utilized with existing aircraft passenger seats, without requiring any modification to the passenger seat. However, restraint device 20 may be utilized in conjunction with seats of other transportation devices, such as automobiles, trains, etc. Base member 30 provides a secure foundation for restraint device 20 and the dynamic load path.

Base member 30 includes a first outer end 32 and a second end 34, as well as a top surface 36 and a bottom surface 38. A pair of support members 40 and 42, having ramps 44 and 46, respectively are disposed on top surface 36, and are preferably constructed integral with base member 30. Support members 40 and 42 provide front end support for seat pan 120 when seat pan 120 is in its sitting or downward position, discussed below. In its downward position, seat pan 120 rests upon flat portions 48 and 50 of support members 40 and 42, respectively. Alternatively, support members 40 and 42 can be square shaped, thus, providing a larger area for seat pan 120 to rest upon.

Though two support members 40 and 42 are shown, such is not limiting, and other configurations which provide support for seat pan 120 can be utilized and are considered within the scope of the invention.

A protective member 37 can be provided at least along first outer end 32 to protect seat cushions 302 and 304 from ripping when restraint device 20 is secured to vehicle seat 300 in either the aft facing orientation or the forward facing orientation.

A locking mechanism, such as a conventional latch means 58, can also be provided to secure or lock seat pan 120 in its downward position. A portion of the locking mechanism can be disposed between support members 40 and 42. However, the precise position of the locking mechanism, as well as the structure of the locking mechanism itself, is not critical or limiting. Furthermore, though a locking mechanism is preferred for maintaining seat pan 120 in its downward position, it is not critical to the operation of the invention that a locking mechanism is provided.

Figure 6:
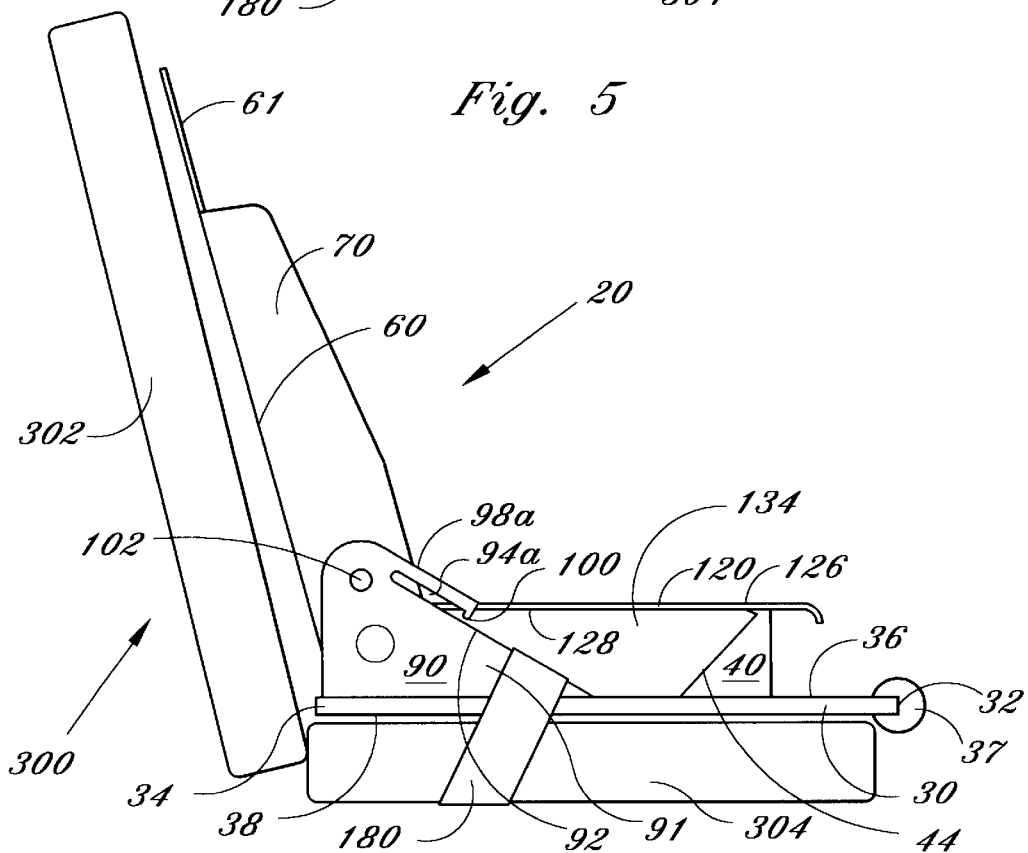
FIG. 6 is a side view illustrating the child restraint device shown in FIG. 3 in a forward facing (toddler) configuration.
Figure 8:
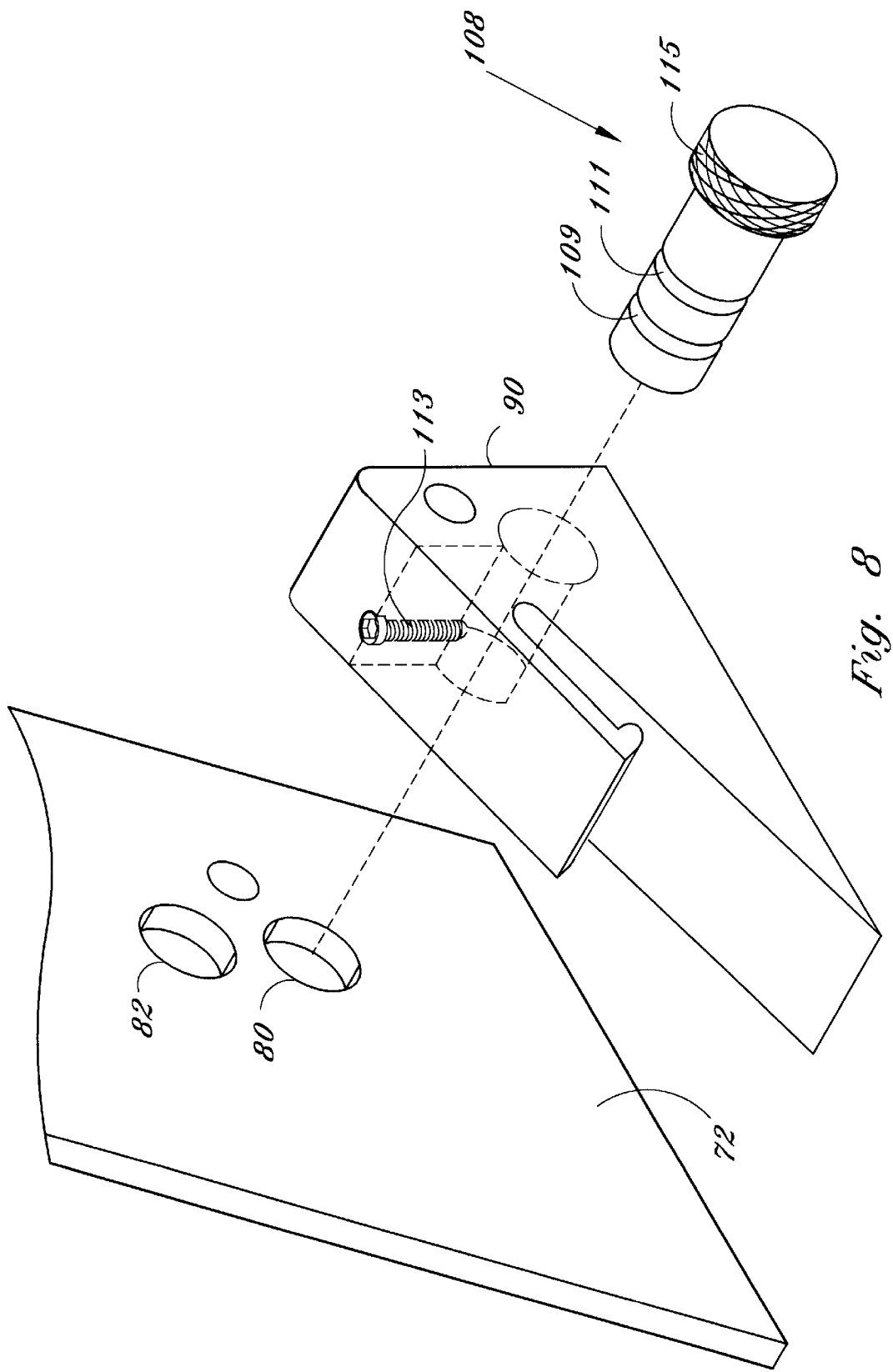
FIG. 8 is an isometric view illustrating the locking pin member in accordance in accordance with the invention shown in FIG. 3.

Base member 30 also includes a pair of wing structures 50, preferably hinged to the underside of base member 30. Wing structures 50 provide a means to properly support and restrain infants, while maintaining a fixed angle of approximately one hundred and five (105°) degrees between base member 30 and back panel 60. Infants and small children without sufficient neck strength are preferably installed in restraint device 20 in an aft facing orientation (FIG. 5), utilizing wing structures 50, as opposed to a forward facing orientation (FIG. 6). In use, wing structures 50 bow slightly outward to prevent wing structures from inadvertently closing. Furthermore, the weight of the child or infant secured by restraint device 20 also helps to prevent wing structures from inadvertently closing.

In the aft facing orientation, wing structures 50 are rotated into position whereby wings 50 achieve an additional angle of approximately thirty (30°) degrees back rotation of the small child or infant relative to vehicle seat cushion 304. Thus, an angle of approximately one hundred and thirty five (135°) degrees back from the plane of seat cushion 304. This angle provides comfort, support and appropriate restraint for infants.

Figure 13:
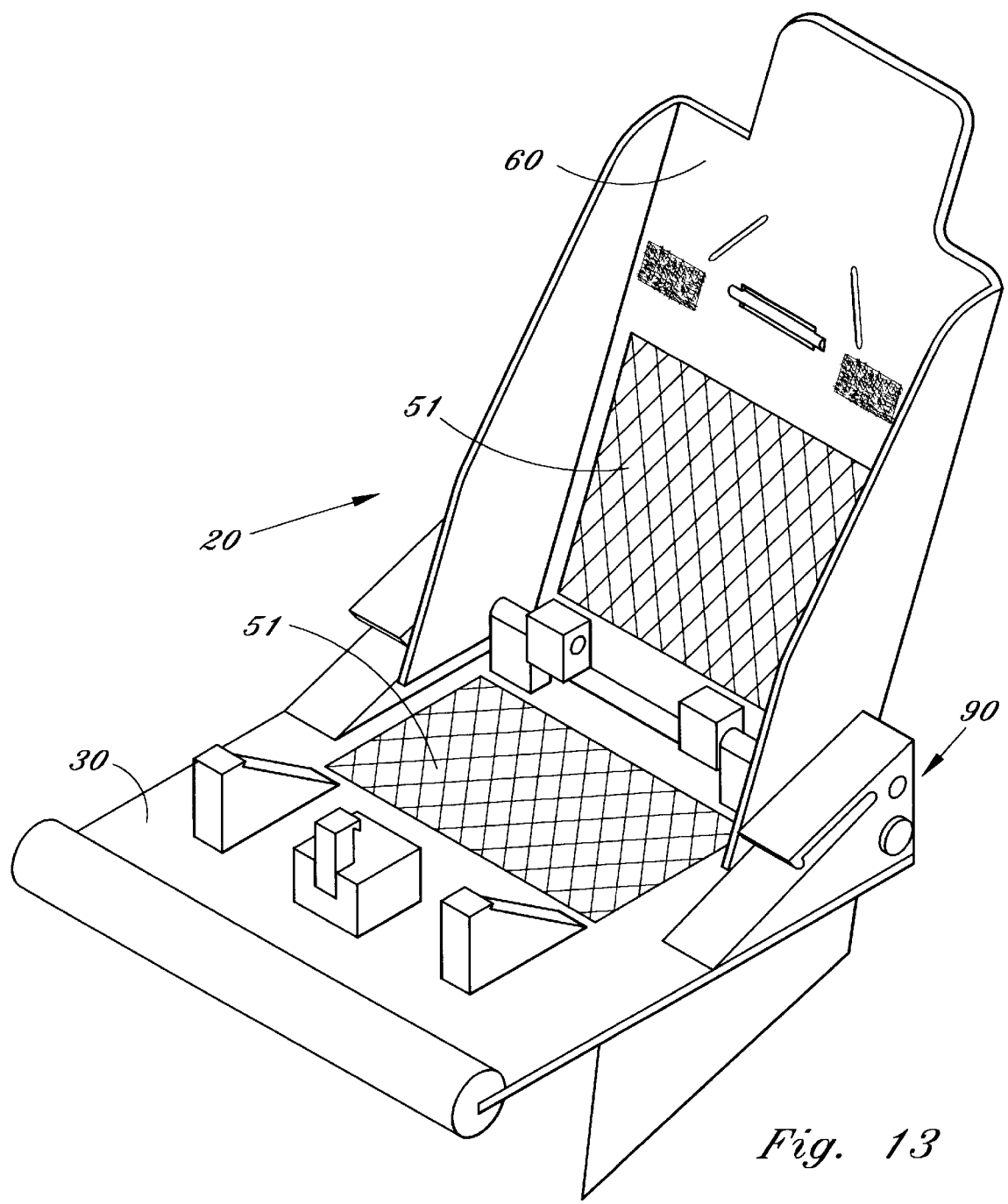
FIG. 13 is a front isometric view illustrating an alternative frame for the child restraint device.
Figure 16:
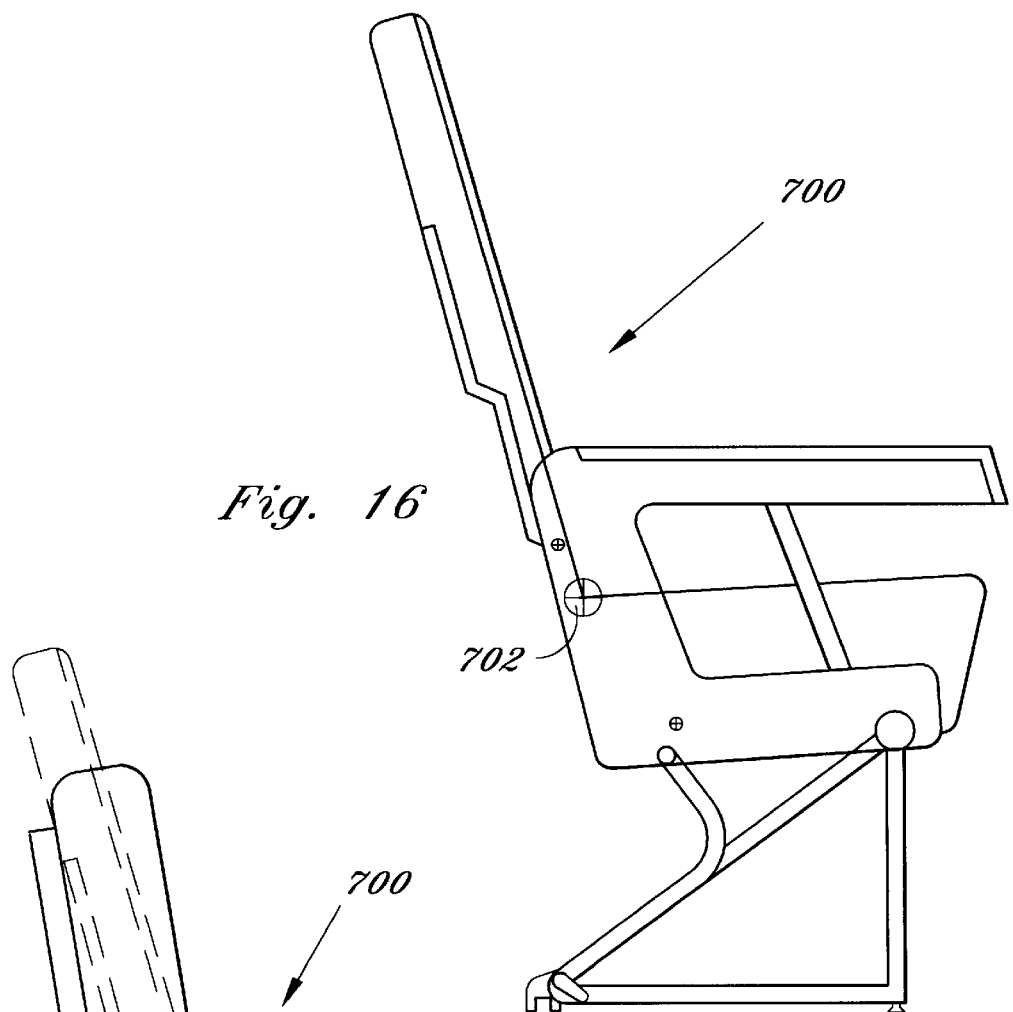
FIG. 16 is a side view of a conventional aircraft passenger seat.
Figure 17:
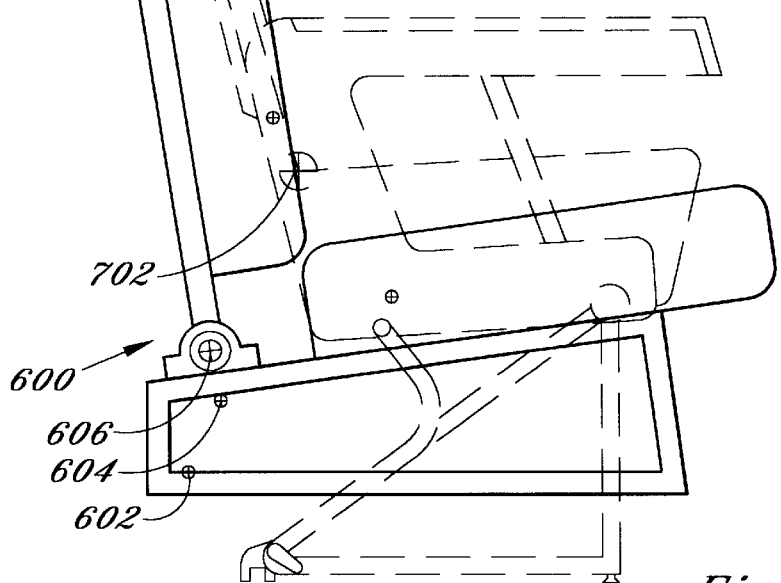
FIG. 17 is a side view of a conventional carseat having a conventional aircraft passenger seat superimposed, in phantom, over the conventional carseat.

Base member 30 can be constructed from aluminum, plastics, composite materials, as well as other known materials. Furthermore, as seen in FIG. 13, a portion of base member 30 can be constructed from a net/mesh (webbing) material 51, or a fabric-like material, as this area of base member 30 does not have to be rigid. By providing a web or nylon material, the overall weight of restraint device 20 is reduced for convenience considerations when transporting or lifting restraint device 20. The removal of a portion of base member 30 can also provide additional comfort for the infant or child restrained by device 20.

Back panel 60 includes a first outer end 62 and a second end 64, as well as an inner surface 66 and an outer surface 68. Rigid side flanges 70 and 72 are provided at each side of back member 60 and are preferably constructed integral with back panel 60. Slots 74, 76 and 78 are provided through back panel 60 for insertion and attachment of restraint belt 140, discussed further below. A head rest area 61 can be provided and is preferably constructed integral with back panel 60. A conventional cushion or padding member (not shown) is preferably provided adjacent head rest area 61.

Flanges 70 and 72 are each preferably provided with a first aperture 80 for receipt of a locking pin 108 which maintains back panel 60 in angular position with respect to base member 30 during use of restraint device 20. Flanges 70 and 72 can also be provided with a second aperture 82 for receipt of locking pin 108 to maintain back panel 60 in a folded position when transporting or storing restraint device 20. In lieu of apertures 82, restraint device 20 can be provided with a strap member attached to either back panel 60 or base member 30 which would attached to either base member 30 or back panel 60, respectively, by conventional means such as velcro or snaps.

Back panel 60 can be constructed from aluminum, plastics, composite materials, as well as other known materials. Furthermore, as seen in FIG. 13, similar to base member 30, a portion of back panel 60 can be constructed from a net/mesh (webbing) material 51, or fabric-like material. By providing a web or nylon material, the overall weight of restraint device 20 is reduced for convenience considerations when transporting or lifting restraint device 20. The removal of a portion of back panel 60 can also provide additional comfort for the infant or child restrained by device 20.

Hinged structure 90 is preferably constructed integral with base member 30 and is disposed on top surface 36 at second end 34. Preferably, two hinged structures 90 are provided which are identical in structure and operation. Hinged structure 90 includes a triangular block member 91 having a seat belt ramp member 92 and a restraint belt receiving groove 94a or 94b. Receiving groove 94 is defined between a top portion 96 of ramp member 92 and a restraint belt routing finger member 98a or 98b. A small protrusion 100 can extend downward from finger member 98 into groove 94 to help retain restraint belt 140 within receiving groove 94, discussed further below.

Back panel 60 is attached to hinged structure 90 by conventional means such as a bolt 102 which is connected at a first end to block member 91 of hinged structure 90 and at a second end to a respective flange 70 or 72 of back panel 60. The attachment of back panel 60 to hinged structure 90 permits back panel 60 to rotate around the attachment point of bolt member 102.

To maintain back panel 60 in its open position, a locking pin 108 is provided. Locking pin 108 can either be turned or pushed through first aperture 80 of respective flange 70 or 72. Preferably, locking pin 108 includes grooves 109 and 111 for receipt of pin 113. To lock panel 60 in place, pressure is exerted on locking pin 108 to cause pin 113 to be disposed within groove 111, which in turns allows a portion of locking pin 108 to be inserted through aperture 80, thus, maintaining back panel in proper position. To release back panel 60, pin 108 is pulled outward, causing pin 113 to be disposed within groove 109, and removing locking pin 108 from its position within aperture 80 and allowing back panel 60 to be rotated relative to base member 30. Locking pin 108 can be provided with a knurled gripping area 115, for easier handling.

When first aperture 80 is aligned with locking pin 108 to allow insertion of locking 108 therethrough, back panel 60 is designed to be specifically form approximately a one hundred and five (105°) degree angle with respect to base member 30.

Restraint device 20 is designed to fold into a relatively thin (approximately four (4) inches) stowable assembly. When storing or transporting restraint device 20, locking pin 108 is removed from its inserted position within aperture 80 to allow back panel 60 to be folded towards base member 30 (FIG. 7). Once in its closed position, locking pin 108 can be inserted through second aperture 82 of respective flanges 70 and 72, to retain restraint device 20 in its closed position.

Seat pan 120 has a first end 122 and a second end 124, as well as a top surface 126 and a bottom surface 128. Seat pan 120 includes a latching member 130 which is attached to bottom surface 128 and mates with locking mechanism 58 disposed on top surface 36 of base member 30 to maintain seat pan 120 in its downward (sitting) position. Seat pan 120 provides a sitting or resting surface for the small child or infant and is connected through a separate hinged member located at the rear of seat pan 120 to base member 30.

Seat pan 120 can be rotated from an upward position to its downward position by its attachment approximate its second end 124. In one attachment embodiment a first set of block members 132 are disposed on top surface 36 of base member 30 and are associated with a second set of block members 134 by a bolt member 136. When moving seat pan from an upward position to its downward position, second block members 134 rotate around respective first block members 132 at bolt member 136. Block members 132 and 134 also provide support for seat pan 120 at its rear end.

A seat belt passageway 134 is defined between seat pan 120 and base member 30 for insertion therethrough of a conventional seat belt 180, to tighten restraint device 20 to existing seat 300, without any modification to seat 300. When attaching restraint device 20 to seat 300, restraint device 20 is removed from its storage location and placed on seat member. If the forward facing configuration is desired (FIG. 6), base member 30 is resting upon sitting area 304 of seat 300.

In use, the installer (a flight attendant in one use of the present invention) releases locking pin 108 from second aperture 82 and rotates back panel 60 to its open position and inserts locking pin 108 into aperture 80, as described above. Next, locking mechanism 58 is released and the installer lifts or rotates seat pan 120 up to provide access to seat belt passageway 134. The installer then routes seat belt 180 across passageway 134 and tightly connects seat belt 180 by conventional means, i.e. buckles. Seat belt 180 is connected tightly to either ramp portion 92 of hinged structure 90 (forward facing configuration) or base member 130 in between ramp portions 40, 42 and 92 (aft facing configuration) in order to safely secure restraint device 20 to existing seat member 300. In either the forward facing orientation or the aft facing orientation, seat belt 180 forms approximately a forty five (45°) degree angle when properly tightened to effectively prevent most, if not all, translational and rotational forces from acting on restraint device 20.

Preferably, when tightening restraint device 20 to seat 300, the installer applies pressure on base member 30 to assure for a tighter fit. With seat belt 180 secured, the installer returns seat pan 120 down to its latched or locked position, and restraint device 20 is then ready for seating by the small child or infant passenger.

In either configuration, when restraint device 20 is properly attached, a portion of restraint device 20, in additional to resting on sitting area 304 of seat 300, also abuts a portion of back area 302 of seat 300 (back panel 60 in the forward facing configuration and the outer edge of base member 30 in the aft facing configuration). Also in either configuration, the attachment angle of seat belt 180 approximately forty five (45°) which prevents restraint device 20 from either relatively moving significantly in a horizontal (translational) direction, vertical direction or from rotating.

Once restraint device 20 is properly attached and the child or infant has been properly positioned in restraint device 20, the child is properly secured within restraint device 20 by a restraint belt 140. Restraint belt 140 is a single continuous belt which is attached at its middle area to a dowel member 75. Dowel member 75 is attached to back panel 60 by conventional means and is preferably constructed integral with back panel 60 to define slots 74. As dowel member 75 is associated with the middle of restraint belt 140, restraint belt 140 is divided into two belt portions 142a and 142b. Both belt portions 142a and 142b extend out of slot 74. Belt portion 142a is then fed through slot 76, while belt portion 142b is fed through slot 78.

When securing the child or infant, belt portion 142a is angled to fold over finger member 98b and through groove 94b. Similarly, belt portion 142b is angled to fold over finger member 98a and through groove 94a, wherein the respective ends of restraint belt are joined together by conventional means, such as buckle means 143. Once joined, the sections of belt portions 142a and 142b which are disposed between locking fingers 98a and 98b form a lap restraint member 145, while the remaining sections of belt portions 142a and 142b define an "X" shaped harness restraint member 147. Restraint belt 140 provides a single release point which controls both lap restraint member 145 and harness restraint member 147 to allow for relatively quick and easy removal of the restrained child or infant in an emergency situation.

The belting configuration shown in FIG. 9, is largely self-adjusting to the size and shape of child user to best restrain his or her forward movement in a vehicle impact accident, as pressure on upper torso restraint member 147 results in a corresponding tightening of the lower restraint member 145.

Thus, routing finger members 98a and 98b translate the direction of belt portions 142b and 142a, respectively, from across the child or infant's torso, to laterally across the lower torso, upper femur region. The configuration of restraint belt 140 tightly and securely retains the infant or child within restraint device 20. Furthermore, the configuration of restraint belt 140 also eliminates the need for a Gz (crotch) strap through seat pan 120 to allow a more universal fit for all infants and children approximately under forty (40) inches in height.

Preferably, cushioning and fabrics will be provided with restraint device 20 and are discussed further below. Belt portions 142a and 142b emerge through the cushions and fabric adjacent slots 76 and 78 which is at a point above and proximal to the nominal shoulder height of a six (6) month child. When seating a child with a sitting height greater than a nominal six month old child, belt portions 142a and 142b project over the shoulder of the child and then resume their belt pattern as described above. When the child or infant is significantly shorter in sitting height than the six month old child, provisions can be made, such as the disposal of extra padding or a plurality of hygiene shields 181 between the infant and seat pan 120, etc., to boost the smaller child to the nominal shoulder height of a six month old child. In lieu of stackable shields, an infant adaptor shim (not shown) having padding disposed within can be provided to elevate the infant.

Alternatively, belt portions 142a and 142b may be routed directly from panel 60 and through grooves 94a and 94b, respectively, to translate the direction of belt portions 142a and 142b from vertical and parallel to the child's torso, to lateral across the lower torso, upper femur region, affecting a restraint lap belt. This alternative belt configuration (FIG. 10), while inappropriate for use in higher risk environments (e.g. automotive use at any time, aircraft use during takeoff and landing), can be utilized during the cruise portion of a flight to assure protection from turbulence events while providing a greater level of comfort for the child or infant, as well as the accompanying adult. The use of this alternative belting configuration, where appropriate, may also encourage greater compliance during periods where the belting configuration illustrated in FIG. 9 is required (higher risk environments). It should be understood that there are several alternative belt configurations which can be utilized with the present invention which would be apparent to one having ordinary skill in the art and that such alternative configurations are also considered within the scope of the present invention. For example, it is not necessary that belt portions 142a and 142b hang or drape as illustrated in FIG. 10 or that belt portions 142a and 142b are twisted or turned in any one specific configuration.

Restraint device 20 is preferably provided with conventional cushioning, padding and coverings (not shown) throughout device 20 to provide comfort and additional safety which in turn encourages child or infant passenger use. Preferably, the coverings provided are constructed from conventional cloth materials to provide aesthetic and comfort benefits to the child passenger, as well as hiding the underlying frame member (base member 30, back panel 60, hinged structure 90 and seat pan 120) of device 20.

The cushions, padding and coverings are modular in design to allow for rapid changes. The coverings preferably extends over the entire assembly 20. With respect to base member 30, the covering can be in a skirted manner to discourage tampering with the security of seat belt arrangement. The covering and padding are also attached such that the installer can access the seat belt passageway when initially securing restraint device 20 to existing seat 300, as described above. The cushions, padding and coverings can be similar to cushions, padding and coverings normally associated with a conventional aircraft passenger seat.

Additionally or alternatively, a restraint seat pad 170 can be provided which is attached to restraint device 20 by conventional means, such as snaps, tapes, adhesives, etc. (not shown). Furthermore, pad 170 can be attached to restraint device 20 by hook and loop fasteners 172 disposed at various portions of pad 170 which mate with hook and loop fasteners 21 disposed at various points on restraint device 20. Pad 170 provides a comfortable sitting area for the infant or small child.

A disposable shield 181 having a moisture proof liner and absorbent padded region can be installed, for hygiene purposes, prior to placing the small child or infant in restraint device 20. Shield 181 can be designed to be continuous over the restraint pan to maintain cleanliness and control spills, diaper leaks, etc. Customized logos, designs, characters, etc. can be incorporated into shield 181 to further assure acceptance of restraint device 20 by the small child or infant.

Shield 181 preferably consists of a continuous barrier layer and a continuous absorbent layer and is designed to be disposable with each child's use. Replacing shield 181 with each child's use provides the benefit of protecting restraint devices' fabric cushions and hardware from stains and soiling, leaving the remainder of the restraint seat cushion and structure clean and ready for the next child passenger, preferably, once shield 181 is replaced.

Shield 180 is attached to restraint device 20 by conventional means such as hook and loop fasteners 182 disposed at various points of shield 181 which mate with hook and loop fasteners 174 of seat pad 170 or with hook and loop fasteners 21 of restraint device 20 (where no seat pad 170 is provided). Furthermore, shield 181 can also be attached to seat pad 170 or restraint device 20 by other conventional methods such as hair net means, elastic, snaps, tapes, adhesives, etc. (not shown). Shields 181 can be of a sufficient thickness to allow stacking of shields 181 in order to raise a small child or infant as discussed above, or alternately be placed on or above a shim.

Restraint device 20 is designed to accommodate a full range of infant and toddler sizes approximately up to forty (40) inches and/or forty (40) pounds. Restraint device 20 is sized to fit all Part 121 and Part 135 airline seats without any modifications to the seats. Restraint device 20 has been tested to meet the FAA's published guidance of maximum head path of twenty four (24) inches.

Restraint device 20 provides a low seat belt path 134 beneath seat pan 120 to provide effective restraint for restraint device 20 in both the forward facing and aft facing orientations and in a wide range of vehicle placements. Particularly, in aircraft seat placements, conventional restraint devices, such as restraint devices 400 and 450, provide limited restraint against the forward impact vector. However, in view of the low belt path feature of restraint device 20, positive restraint of device 20 is provided in all directions. A conventional handle member (not shown) can also be provided for ease in transporting or carrying restraint device 20.

The frame of restraint device 20 is preferably constructed of an aircraft grade aluminum for durability, while the belts, pads, and other soft goods can be designed for routine cleaning with soap and water. Disposable shield 180 can be designed for replacement after each use and extends the useful life of the soft goods below.

The attachment of restraint device 20 to seat 300, solely by lapbelt 180, eliminates additional seat certification, labor work rule issues, and avoids other complicating variances to standard airline practices.

FIGS. 14 and 15 illustrate an alternative embodiment for the present invention. A child restraint device 500 is shown having a base member 502, back panel 504, and seat pan 506 which would operate and be structurally similar to base member 30, back panel 60 and seat pan 120 discussed above. Furthermore, a hinged structure, locking mechanism, and restraint belt, as described above, though not shown, could also be provided. Restraint device 500 is provided with two seat pan support member 508 and 512 which are provided with a seat belt ramp 510 and 514, respectively. Preferably two support members 508 and two support members 512 are provided with one support member 508 and one support member 512 disposed near a left side of base member 502 and second support member 508 and second support member 512 disposed near a right side of base member 502. However, it is also within the scope of the invention to provide single support members 508 and 512 extending across base member 502.

In the aft facing orientation (FIG. 14), seat belt 180 is positioned along ramp member 510 of support member 508 and tightly secured, similar as described above by lifting seat pan 506. In the forward facing orientation (FIG. 15), seat belt 180 is positioned along ramp member 514 of support member 508 and tightly secured. As shown, back panel can be adjusted and held in place from a vertical position (forward facing orientation) to an angled position (aft facing orientation) by conventional means. In this embodiment restraint device 500 is provided with a rising belt path structure.

In all of the embodiments of the present invention the child and infant restraint device is an integral unit which is provided with an articulating linkage means for securing the base member, the back member and the seat pan member to one another. Furthermore, the base member, back member and seat pan member can either move dependently or independently of one another as is required or determined by use of the restraint devices of the present invention.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A child and infant restraint device for use with a vehicle seat, said vehicle seat including an associated seat belt, said restraint device capable of being used in a forward facing orientation or in an aft facing orientation, said restraint device comprising:

a base member having a front end, a rear end, a top surface and a bottom surface;

a back member having a top end, a bottom end, a front surface and a rear surface, said back member rotatably connected at its bottom end directly to the rear end of said base member to allow said back member to be pivotally adjusted with respect to said base member;

a continuous unitary seat pan member rotatable connected to said base member such that the entire seat pan member is rotatable between a downwardly rotated sitting position of use and an upwardly rotated position, said seat pan member and said base member defining a belt path therebetween when said seat pan is in said downwardly rotated position of use both in said forward facing orientation and in said aft facing orientation, said seat pan member connected to said base member independent of the connection of said back member to said base member, said seat pan member connected to said base member at a same horizontal plane as a portion of said belt path when said device is secured in said forward facing orientation, said back member positioned aft of said belt path when said device is secured in a forward facing orientation with said back member in said upwardly rotated open position of use, said restraint device adapted to be secured in either said forward facing orientation or in said aft facing orientation to said vehicle seat; and means for safely restraining a child or infant to said restraint device.

2. The restraint device of claim 1 wherein said vehicle seat is a conventional airplane passenger seat.

3. The restraint device of claim 1 further including seat pan support means disposed on the top surface of said base member providing support to said seat pan when said seat pan is in its downward sitting position.

4. The restraint device of claim 1 further including a first hinged structure directly attached to a left side of said base member and a second hinged structure directly attached to a right side of said base member, said first and second hinged structures disposed on the top surface of said base member at the rear end of said base member, said first and second hinged structures each having a ramp portion and each defining a restraining belt groove, said hinged structures acting as a guide for said means for safely restraining and said seat belt.

5. The restraint device of claim 4 wherein said means for safely restraining is a single sole restraint belt attached to said back panel substantially at a restraint belt middle point to divide said restraint belt into a first belt section and a second belt section, said restraint belt provided with mating buckle members at its respective ends to connect the ends of said restraint belt to each other and safely secure the disposed infant or child within said restraint device.

6. The restraint device of claim 5 wherein said first belt section is adapted to be disposed over a left shoulder and across an upper torso area of the child or infant, over said right side hinged structure, through the groove of said right side hinged structure and over a right portion of the child's lap area; wherein said second belt section is adapted to be disposed over a right shoulder and across the upper torso area of the child or infant, over said left side hinged structure, through the groove of said left side hinged structure and over a left portion of the child's lap area for mating with said first belt section by conventional means.

7. The restraint device of claim 6 wherein said restraint belt defines both an "X" shaped harness restraint member and a lap restraint member and has a single release point.

8. The restraint device of claim 1 further including padding or cushioning disposed throughout said restraint device.

9. The restraint device of claim 1 further including a disposable shield member removably attached to the device for hygiene purposes.

10. The restraint device of claim 1 further including means for retaining said seat pan member in a downward sitting position attached to said base member.

11. The restraint device of claim 4 wherein said back member has a left side flange member and a right side flange member.

12. The restraint device of claim 11 further including means for maintaining said back panel in an open position provided on said hinged structures and said flange members.

13. The restraint device of claim 12 wherein said means for maintaining is a locking pin disposed through each of said hinged structures and a first aperture disposed in each of said side flanges, wherein when said back member is in its open position, said first apertures are aligned with respective locking pins and said locking pins are inserted through their respective first apertures to maintain said back member in its open position.

14. The restraint device of claim 11 further including means for maintaining said back member in a closed position.

15. The restraint device of claim 14 wherein said means for maintaining is a locking pin disposed through each of said hinged structures and a first aperture disposed in each of said side flanges, wherein when said back member is in its close position, said first apertures are aligned with respective locking pins and said locking pins are inserted rough their respective first apertures to maintain said back member in its close position.

16. The restraint device of claim 1 further including a pair of one piece wing members each hingedly attached to said base member, said wing members disposed in an open position when said restraint device is secured to the vehicle seat in said aft facing orientation to rotate said restraint device substantially thirty degrees.

17. A child and infant restraint device for use with a conventional airplane passenger seat, said restraint device capable of being used in a forward facing orientation or in an aft facing orientation, said conventional airplane passenger seat including an associated seat belt, said restraint device comprising:
   a base member having a front end, a rear end, a top surface and a bottom surface;
   a back member having a top end, a bottom end, a front surface and a rear surface, said back member having a left side flange member and a right side flange member;
   a continuous unitary seat pan member rotatably connected to said base member such that the entire seat pan member is rotatable between a downwardly rotated sitting position of use and an upwardly rotated position, said seat pan member and said base member defining an unobstructed passageway therebetween when said seat pan is in said downwardly rotated position of use both in said forward facing orientation and in said aft facing orientation, said seat pan member connected to said base member independent of the connection of said back member to said base member, said seat pan member connected to said base member at a same horizontal plane as a portion of said passageway when said device is secured in said forward facing orientation, said back member positioned aft of said passageway when said device is secured in a forward facing orientation with said back member in said upwardly rotated open position of use, said restraint device adapted to be secured in either said forward facing orientation or in said aft facing orientation to a conventional airplane passenger seat;
   a first hinged structure attached to a left side of said base member and a second hinged structure attached to a right side of said base member, said first and second hinged structures disposed on the top surface of said base member at the rear end of said base members, said back member rotatably connected at its bottom end to said first hinged structure and said second hinged structure;
   means for safely restraining a child or infant disposed within said restraint device, said hinged structures also acting as guides to said means for safely restraining and said seat belt;
   a pair of one piece wing structures hingedly connected to said base member; and
   means for maintaining said back panel in either an open or close position;
   wherein when securing said restraint device to said conventional airplane passenger seat said seat belt is disposed through said passageway.

18. The restraint device of claim 17 further including seat pan support means disposed on the top surface of said base member.

19. The restraint device of claim 18 wherein said means for maintaining is a locking pin disposed through each of said hinged structures and a first aperture and a second aperture disposed in each of said side flanges, wherein when said back panel is in its open position, said first apertures are aligned with their respective locking pins and said locking pins are inserted through their respective first apertures to maintain said back member in its open position, wherein when said back panel is in its close position, said second apertures are aligned with their respective locking pins and said locking pins are inserted through their respective second apertures to maintain said back panel in its close position.

20. The restraint device of claim 17 wherein said first and second hinged structures each has a ramp portion and each defines a restraining belt groove.

21. The restraint device of claim 20 wherein said means for safely restraining is a single sole restraint belt attached to said back panel substantially at a restraint belt middle point to divide said restraint belt into a first belt section and a second belt section, said restraint belt provided with mating buckle members at its respective ends to connect the ends of said restraint belt to each other and safely secure the disposed infant or child within said restraint device.

22. The restraint device of claim 21 wherein said restraint belt defines both an "X" shaped harness restraint member and a lap restraint member and has a single release point.

23. A child and infant restraint device for use with an aircraft passenger seat, said restraint device capable of being used in a forward facing orientation or in an aft facing orientation, said passenger seat including an associated seat belt, said restraint device comprising:
   a base member having a front end, a rear end, a top surface and a bottom surface;
   a back member having a top end, a bottom end, a front surface and a rear surface, said back member having a left side flange member and a right side flange member, said left side flange member and said right side flange each having a first aperture and a second aperture;
   a continuous unitary seat pan member hingedly connected to said base member such that the entire seat pan member is rotatable between a downwardly rotated sitting position of use and an upwardly rotated position, said seat pan member and said base member defining an unobstructed belt passageway therebetween when said seat pan is in said downwardly rotated position of use both in said forward facing orientation and in said aft facing orientation, said seat pan member connected to said base member independent of the connection of said back member to said base member, said seat pan member connected to said base member at a same horizontal plane as a portion of said belt passageway when said device is secured in said forward facing orientation, said back member positioned aft of said belt passageway when said device is secured in a forward facing orientation with said back member in said upwardly rotated open position of use, said restraint device adapted to be secured in either said forward facing orientation or in said aft facing orientation to said aircraft passenger seat;
   a first hinged structure attached to a left side of said base member and a second hinged structure attached to a right side of said base member, said first and second hinged structures disposed on the top surface of said base member at the rear end of said base member, said back member rotatably connected at its bottom end to said first hinged structure and said second hinged structure; said first hinged structure and said second hinged structure each having a locking pin extending through said hinged structures and mating with either said first aperture or said second aperture of a respective said flange member;

a single sole restraint belt attached to said back member substantially at a restraint belt middle point to divide said restraint belt into a first belt section and a second belt sections said restraint belt provided with mating buckle members at its respective ends to connect the ends of said restraint belt to each other and safely secure an infant or child disposed within said restraint device, said hinged structures acting as guides to said restraint belt and said seat belt;

a pair of wing structures hingedly connected to said base member;

a pair of seat pan support means disposed on the top surface of said base member, said support means providing support to said seat pan when said seat pan is in its downward sitting position;

wherein when securing said restraint device to said aircraft passenger seat said seat belt is disposed through said belt passageway;

wherein when said back member is in its open position, said first apertures are aligned with their respective locking pins and said locking pins are inserted through their respective first apertures to maintain said back panel in its open positions, wherein when said back panel is in its closed position, said second apertures are aligned with their respective locking pins and said locking pins are inserted through their respective second apertures to maintain said back panel in its closed position.

24. The restraint device of claim 23 wherein said restraint belt defines both an "X" shaped harness restraint member and a lap restraint member and has a single release point.

25. The restraint device of claim 23 wherein said wing structures are disposed in an open position when said restraint device is secured to the passenger seat in said aft facing orientation to rotate said restraint device substantially thirty degrees.

26. A child and infant restraint device for use with a conventional airplane passenger seat, said passenger seat including an associated seat belt, said restraint device comprising:

a base member having a front end, a rear ends a top surface and a bottom surface;

a back member having a top end, a bottom end, a front surface and a rear surface;

a continuous unitary seat pan member providing a resting area for the intended infant or child;

articulating linkage means for pivotally attaching said base member to said back member and the entire seat pan member to said base member, said base member and said back member pivotally attached to one another independent from the pivot attachment of said seat pan member to said base member, said seat pan being rotatable between a downwardly rotated sitting position of use and an upwardly rotated position said seat pan member and said base member defining a belt passageway therebetween when said seat pan is in said downwardly rotated position of use both in a forward facing orientation and in an aft facing orientation, said seat pan member connected to said base member at a same horizontal plane as a portion of said belt passageway when said device is secured in said forward facing orientation, said back member positioned aft of said belt passageway when said device is secured in a forward facing orientation with said back member in said upwardly rotated open position of use, said base member adapted to be secured in either said forward facing orientation or in said aft facing orientation to said airplane passenger seat; and means for safely restraining a child or infant to said restraint device, said articulating linkage means also acting as a guide for said seat belt and said means for safely restraining;

wherein said restraint device is an integral unit.

27. The restraint device of claim 1 wherein said restraint device is adapted to be attached to an aircraft seat without modification to the aircraft seat.

28. The restraint device of claim 17 wherein said restraint device is adapted to be attached to an aircraft seat without modification to the aircraft seat.

29. The restraint device of claim 23 wherein said restraint device is adapted to be attached to an aircraft seat without modification to the aircraft seat.

30. The restraint device of claim 26 wherein said restraint device is adapted to be attached to an aircraft seat without modification to the aircraft seat.

* * * * *